(12) United States Patent
Maenaka et al.

(10) Patent No.: US 8,420,269 B2
(45) Date of Patent: Apr. 16, 2013

(54) FUEL CELL SYSTEM

(75) Inventors: Takeshi Maenaka, Toyota (JP); Atsushi Imai, Gamagori (JP)

(73) Assignee: Toyota Jidosha Kabushiki Kaisa, Toyota-Shi (JP)

( * ) Notice: Subject to any disclaimer, the term of this patent is extended or adjusted under 35 U.S.C. 154(b) by 373 days.

(21) Appl. No.: 12/742,335

(22) PCT Filed: Nov. 11, 2008

(86) PCT No.: PCT/JP2008/070483
§ 371 (c)(1),
(2), (4) Date: May 11, 2010

(87) PCT Pub. No.: WO2009/063854
PCT Pub. Date: May 22, 2009

(65) Prior Publication Data
US 2010/0266914 A1    Oct. 21, 2010

(30) Foreign Application Priority Data
Nov. 12, 2007 (JP) ................. 2007-292922

(51) Int. Cl.
*H01M 8/04* (2006.01)
(52) U.S. Cl.
USPC ......................................................... 429/429
(58) Field of Classification Search ............ 429/429
See application file for complete search history.

(56) References Cited

U.S. PATENT DOCUMENTS

2002/0095247 A1 * 7/2002 Ding et al. ............... 701/22
2006/0272868 A1 * 12/2006 Fuse et al. ............... 180/65.1

FOREIGN PATENT DOCUMENTS

| DE | 102 00 120 A1 | 8/2002 |
|---|---|---|
| EP | 1 845 574 A1 | 10/2007 |
| JP | 2001-266917 A | 9/2001 |
| JP | 2003-272684 A | 9/2003 |
| JP | 2004-178910 A | 6/2004 |
| JP | 2005-073475 A | 3/2005 |
| JP | 2005-135666 A | 5/2005 |
| JP | 2006-210087 A | 8/2006 |
| JP | 2006-260962 A | 9/2006 |
| JP | 2007-149450 A | 6/2007 |

* cited by examiner

*Primary Examiner* — Joseph Del Sole
*Assistant Examiner* — Erin Snelting
(74) *Attorney, Agent, or Firm* — Kenyon & Kenyon LLP

(57) ABSTRACT

A fuel cell system is turned off without using up the electric power of a secondary battery in the case where a fuel cell fails to start up, while reducing the startup time of the fuel cell system. When an ignition key is turned on, a controller calculates allowable waiting time for a fuel cell to start up on the basis of the electric power stored in a secondary battery. If the fuel cell fails to start up during the period of time from the instant the ignition key was turned on until the allowable waiting time elapses, then the controller turns on an alarm lamp which indicates the startup failure of the fuel cell. Meanwhile, in the case where the fuel cell starts up, the controller begins a normal operation in which a traction motor and the like are actuated by using the electric power generated by the fuel cell and the electric power stored in the secondary battery.

1 Claim, 2 Drawing Sheets

FUEL CELL SYSTEM

This is a 371 national phase application of PCT/JP2008/070483 filed 11 Nov. 2008, which claims priority to Japanese Patent Application No. 2007-292922 filed 12 Nov. 2007, the contents of which are incorporated herein by reference.

TECHNICAL FIELD

The present invention relates to a fuel cell system.

BACKGROUND ART

In general, a vehicle having a fuel cell system mounted therein drives a traction motor by the electric power supplied from a fuel cell and a secondary battery. In such a vehicle, the fuel cell is started up when a driver requests the operation, and the drive of the traction motor is started after completion of the startup of the fuel cell, inconveniently taking time for the fuel cell system to start. Patent document 1 shown below discloses a technique for shortening the time for starting up a fuel cell system by estimating the time for starting up a fuel cell when starting a fuel cell system, then by starting the drive of a traction motor by using the electric power of a secondary battery, which is an power storage unit, before the startup of the fuel cell is completed.

[Patent document 1] Japanese Patent Application Laid-Open No. 2007-149450

DISCLOSURE OF THE INVENTION

Problem to be Solved by the Invention

In the fuel cell system which adopts the technique for reducing the startup time described above, if, for example, a failure, such as a failure to supply a fuel gas or an oxidizing gas to a fuel cell, occurs and the fuel cell cannot be started up, then the instant the electric power of the secondary battery is used up, the vehicle stops and cannot travel.

The present invention has been made to solve the problem with the prior art described above, and it is an object of the invention to provide a fuel cell system capable of turning the fuel cell system off without using up the electric power of an power storage unit in the case where a fuel cell cannot be started up, while reducing the startup time of the fuel cell system at the same time.

Means for Solving the Problem

To solve the aforesaid problem, a fuel cell system in accordance with the present invention includes: a fuel cell which generates electric power by an electrochemical reaction of a fuel gas and an oxidizing gas; an power storage unit capable of storing electric power generated in the fuel cell; calculating means which calculates allowable waiting time for the fuel cell to start up on the basis of electric power stored by the power storage unit when a request for starting up the fuel cell is received; and alarming means which issues an alarm indicating that the fuel cell cannot be started up in the case where the fuel cell fails to start up during a period of time from the receipt of a startup request until the allowable waiting time elapses.

According to the invention, when starting up the fuel cell, the allowable waiting time is calculated on the basis of the electric power stored in the power storage unit, and if the fuel cell fails to start up during the period of time from the beginning of the startup until the allowable waiting time elapses, then an alarm signaling the failure of the startup of the fuel cell can be issued. This makes it possible to alert a user to the failure of the startup of the fuel cell and therefore the user can turn off the fuel cell system. In other words, the fuel cell system can be turned off without using up the electric power of the power storage unit in the case where the fuel cell cannot be started up, while shortening the startup time of the fuel cell system at the same time.

In the aforesaid fuel cell system, the calculating means may calculate the allowable waiting time within a range of time in which a power consuming device can be operated using the electric power stored by the power storage unit.

This arrangement makes it possible to issue an alarm indicating the startup failure of the fuel cell while the power consuming device is being operated from the electric power stored by the power storage unit, so that the fuel cell system can be turned off before the electric power of the power storage unit is used up.

The fuel cell system further includes control means which operates the power consuming device by using the electric power generated by the fuel cell and the electric power stored by the power storage unit, wherein the control means is capable of turning off the fuel cell system, leaving electric power necessary for starting the operation of at least the power consuming device from the electric power stored by the power storage unit in the case where the fuel cell does not start up during the period of time from the receipt of the startup request until the allowable waiting time elapses.

With this arrangement, in the case where the fuel cell cannot be started up, the fuel cell system can be turned off, leaving the electric power for operating at least the power consuming device next time.

EFFECT OF THE INVENTION

According to the present invention, the fuel cell system can be turned off without using up the electric power of the power storage unit in the case where the fuel cell cannot be started up, while reducing the startup time of the fuel cell system at the same time.

DESCRIPTION OF REFERENCE NUMERALS

1 . . . Fuel cell system; 2 . . . Fuel cell; 3 . . . Oxidizing gas piping system; 4 . . . Hydrogen gas piping system; 5 . . . Electric power system; 6 . . . Controller; 30 . . . Filter; 31 . . . Compressor; 32 . . . Air supply flow path; 33 . . . Air exhaust flow path; 34 . . . Humidifier; 40 . . . Hydrogen tank; 41 . . . Hydrogen supply flow path; 42 . . . Circulation flow path; 43 . . . Main stop valve; 44 . . . Regulator; 45 . . . Hydrogen pump; 46 . . . Gas-liquid separator; 47 . . . Exhaust/drainage valve;

48 . . . Discharge flow path; 49 . . . Diluter; 51 . . . DC/DC converter; 52 . . . Secondary cell; 53 . . . Traction inverter; 54 . . . Traction motor; 55 . . . SOC sensor

BEST MODE FOR CARRYING OUT THE INVENTION

Referring to the accompanying drawings, a preferred embodiment of a fuel cell system in accordance with the present invention will be described below. In the present embodiment, a case where the fuel cell system in accordance with the present invention is used as a vehicle-mounted power generating system for a fuel cell hybrid vehicle (FCHV) will be described.

The fuel cell system in the present embodiment calculates the allowable waiting time for a fuel cell to start up on the basis of electric power stored by an power storage unit upon receipt of a request for starting up the fuel cell, and issues an alarm indicating a failure to start up the fuel cell if the fuel cell fails to start up during the period of time from the receipt of the startup request to the elapse of the allowable waiting time, thereby turning the fuel cell system off without using up the electric power of the power storage unit in the case of the startup failure of the fuel cell, while shortening the startup time of the fuel cell system at the same time. The following will explain in detail the construction and the operation of the fuel cell system having the aforesaid features.

Figure 1:
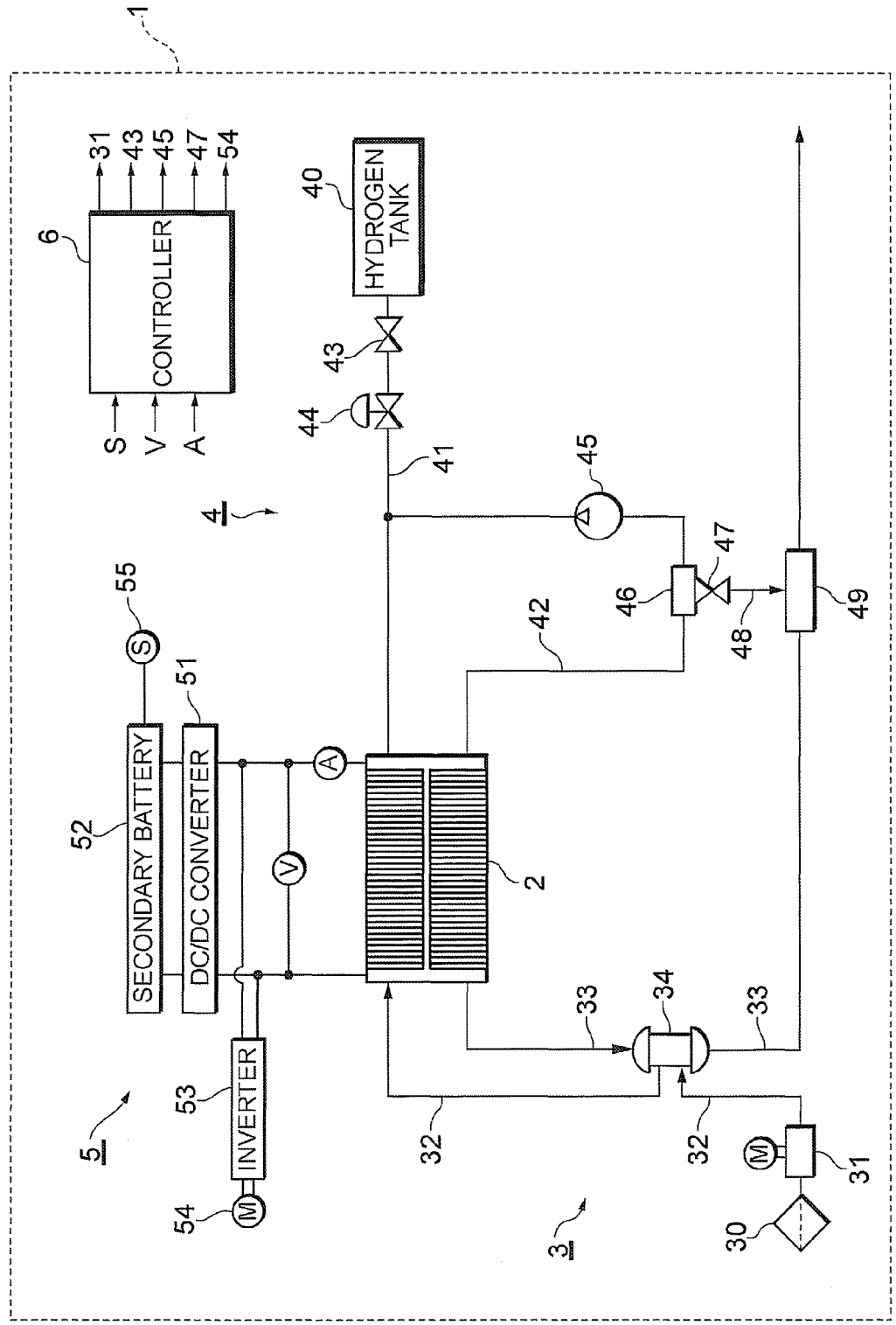
[FIG. 1] It is a block diagram schematically illustrating a fuel cell system according to an embodiment.

Referring to FIG. 1, the construction of the fuel cell system in the present embodiment will be described. FIG. 1 is a block diagram schematically illustrating the fuel cell system in the embodiment.

As illustrated in the figure, a fuel cell system 1 has a fuel cell 2 which generates electric power by an electrochemical reaction of an oxidizing gas and a fuel gas, which are reactant gases, an oxidizing gas piping system 3 which supplies air serving as the oxidizing gas to the fuel cell 2, a hydrogen gas piping system 4 which supplies hydrogen serving as the fuel gas to the fuel cell 2, an electric power system 5 which charges/discharges the electric power of the system, and a controller 6 which integrally controls the entire system. The fuel cell 2 and the hydrogen gas piping system 4 constitute a hydrogen gas supply mechanism.

The fuel cell 2 is, for example, a polyelectrolyte fuel cell and has a stack structure in which many single cells are stacked. Each of the single cells has an air electrode on one surface of an electrolyte composed of an ion exchange membrane, a fuel electrode on the other surface, and a pair of separators sandwiching the air electrode and the fuel electrode from both sides. In this case, the hydrogen gas is supplied to a hydrogen gas passage of one separator, while the oxidizing gas is supplied to an oxidizing gas passage of the other separator. The chemical reaction of these reactant gases generates electric power The fuel cell 2 is provided with a current sensor for detecting an output current of the fuel cell 2 and a voltage sensor for detecting an output voltage of the fuel cell 2.

The oxidizing gas piping system 3 has a compressor 31 which compresses air introduced through a filter 30 and sends out the compressed air serving as the oxidizing gas, an air supply flow path 32 for supplying the oxidizing gas to the fuel cell 2 and an air exhaust flow path 33 for exhausting an oxidizing off-gas discharged from the fuel cell 2. The air supply flow path 32 and the air exhaust flow path 33 are provided with a humidifier 34 which humidifies the oxidizing gas pressure-fed from the compressor 31 by using the oxidizing off-gas exhausted from the fuel cell 2. The oxidizing off-gas which has undergone water exchange or the like by the humidifier 34 is eventually discharged as an exhaust gas into the atmosphere outside the system.

The hydrogen gas piping system 4 has a hydrogen tank 40 serving as a fuel supply source storing a hydrogen gas of a high pressure (e.g., 70 MPa), a hydrogen supply flow path 41 serving as a fuel supply flow path for supplying the hydrogen gas of the hydrogen tank 40 to the fuel cell 2, and a circulation flow path 42 for returning the hydrogen off-gas exhausted from the fuel cell 2 to the hydrogen supply flow path 41. The hydrogen tank 40 is an embodiment of the fuel supply source in the present invention. Instead of the hydrogen tank 40 in the present embodiment, for example, a reformer which reforms a hydrocarbon-based fuel into a hydrogen-rich fuel gas by utilizing water vapor and a high-pressure gas tank which stores, under a high pressure, the fuel gas reformed by the reformer may be adopted as the fuel supply source. Alternatively, a tank having a hydrogen storing alloy may be adopted as the fuel supply source.

The hydrogen supply flow path 41 is provided with a main stop valve 43 which cuts off or enables the supply of the hydrogen gas from the hydrogen tank 40 and a regulator 44 which regulates the pressure of the hydrogen gas to a preset secondary pressure.

The circulation flow path 42 is provided with a hydrogen pump 45 which pressurizes the hydrogen off-gas in the circulation flow path 42 and feeds the pressurized hydrogen off-gas to the hydrogen supply flow path 41. An exhaust flow path 48 is connected to the circulation flow path 42 via a gas-liquid separator 46 and an exhaust/drainage valve 47. The gas-liquid separator 46 recovers moisture from the hydrogen off-gas. The exhaust/drainage valve 47 discharges (purges) the moisture recovered by the gas-liquid separator 46 and the hydrogen off-gas containing impurities in the circulation flow path 42. The hydrogen off-gas exhausted from the exhaust/drainage valve 47 is diluted by a diluter 49 and merges with the oxidizing off-gas in the air exhaust flow path 33.

An electric power system 5 primarily includes a DC/DC converter 51, a secondary battery 52 (power storage unit), which is a battery, a traction inverter 53, a traction motor 54, and various types of auxiliary inverters, which are not shown. The DC/DC converter 51 is a DC voltage transformer and has a function for regulating a DC voltage input from the secondary battery 52 and outputting the regulated voltage to the traction inverter 53, and a function for regulating a DC voltage input from the fuel cell 2 or the traction motor 54 and outputting the regulated voltage to the secondary battery 52. The functions of the DC/DC converter 51 implement the charge/discharge of the secondary battery 52. Further, the DC/DC converter 51 controls an output voltage of the fuel cell 2.

The secondary battery 52 is composed of stacked battery cells and has terminal voltage of a fixed high voltage. The secondary battery 52 is capable of storing surplus electric power or secondarily supplying electric power under the control by a battery computer, which is not shown. The secondary battery 52 has a SOC sensor 55 for detecting the remaining capacity (State of Charge) of the secondary battery 52.

The traction inverter 53 converts a DC current into a three-phase alternating current and supplies the three-phase alternating current to the traction motor 54. The traction motor 54 is, for example, a three-phase AC motor and constitutes a main motive power source of the fuel cell hybrid vehicle in which the fuel cell system 1 is mounted.

The auxiliary inverter is a motor controller which controls the drive of each motor, and converts the DC current into the three-phase alternating current to supply the three-phase alternating current to each motor. The auxiliary inverter is, for example, a pulse-width-modulated (PWM) inverter, which converts a DC voltage output from the fuel cell 2 or the secondary battery 52 into a three-phase AC voltage according to a control command from the controller 6 and controls the rotational torque generated in each motor.

The controller 6 detects the manipulated variable of an acceleration operating member (an accelerator pedal or the like) provided in the fuel cell hybrid vehicle and controls the operation of various types of equipment in the system upon receipt of control information, such as a required acceleration value (e.g., a required amount of power generation from a power consuming device, such as the traction motor 54). Power consuming devices include, for example, auxiliary devices necessary to operate the fuel cell 2 (e.g., the motors of the compressor 31 and the hydrogen pump 45), the actuators used with various types of devices (a transmission, a wheel controller, a steering device, a suspension device, and the like) involved in the travel of a vehicle, and an air conditioning device (an air conditioner), lighting, and audio equipment in a driver compartment, in addition to the traction motor 54.

The controller 6 (a calculating means) calculates the allowable waiting time for waiting the startup of the fuel cell 2 on the basis of the electric power in the secondary battery 52 upon receipt of the request for starting up the fuel cell 2. Whether the request for starting up the fuel cell 2 has been received can be determined by detecting, for example, whether an ignition key has been turned on (a starting operation). In other words, it can be determined that the request for starting the fuel cell 2 has been received when the ignition key is turned on. The electric power stored in the secondary battery 52 can be determined from the value detected by the SOC sensor 55. The allowable waiting time is calculated within a range of time in which the traction motor 54 can be actuated by using the electric power stored in the secondary battery 52. This makes it possible to set the allowable waiting time within the time during which the traction motor 54 can be actuated by the secondary battery 52.

The controller 6 (alarming means) turns on an alarm lamp indicating a startup failure of the fuel cell 2 if the fuel cell 2 fails to start up during the period of time from the receipt of a startup request to the elapse of the allowable waiting time. This means that the driver can be notified of the startup failure of the fuel cell 2 while the traction motor 54 is being actuated by the secondary battery 52. This makes it possible to alert the driver to the failure of the startup of the fuel cell 2, prompting the driver to turn off the fuel cell system 1 before the electric power of the secondary battery 52 is used up. Incidentally, the method for issuing an alarm of a startup failure of the fuel cell 2 is not limited to turning the alarm lamp on, and the alarm can be issued, for example, audibly or visually.

The controller 6 (control means) actuates the traction motor 54 and the like by using the electric power generated by the fuel cell 2 and the electric power stored in the secondary battery 52. After turning on the alarm lamp, if the driver does not perform an operation to stop the fuel cell hybrid vehicle, then the controller 6 turns off the fuel cell system 1, leaving the electric power necessary to start the operation of at least the traction motor 54 from the electric power stored in the secondary battery 52. Thus, the fuel cell hybrid vehicle can be stopped, leaving the electric power that enables the traction motor 54 to operate at the time of a next startup.

The controller 6 may turn on the alarm lamp and turns off the fuel cell system 1 if the fuel cell 2 fails to start up during the period of time from the receipt of the startup request to the elapse of the allowable waiting time. This makes it possible to securely save the electric power stored in the secondary battery 52, thus enabling the traction motor 54 to be securely actuated at a next startup.

Here, the controller 6 physically has, for example, a CPU, a ROM and an HDD for storing control programs and control data to be processed by the CPU, a RAM used as various types of work areas primarily for control processing, and input/output interfaces. These elements are interconnected via buses. Connected to the input/output interfaces are various sensors, including the SOC sensor 55, current sensors and voltage sensors, and various drivers for driving the compressor 31, the main stop valve 43, the hydrogen pump 45, the exhaust/drainage valve 47, and the traction motor 54.

The CPU receives the detection results from the SOC sensor 55, the current sensors and the voltage sensors via the input/output interfaces according to the control programs stored in the ROM and processes the received detection results by using various types of data and the like in the RAM so as to control the processing for starting up the fuel cell system 1. Further, the CPU controls the entire fuel cell system 1 by issuing control signals to various drivers via the input/output interfaces.

Figure 2:
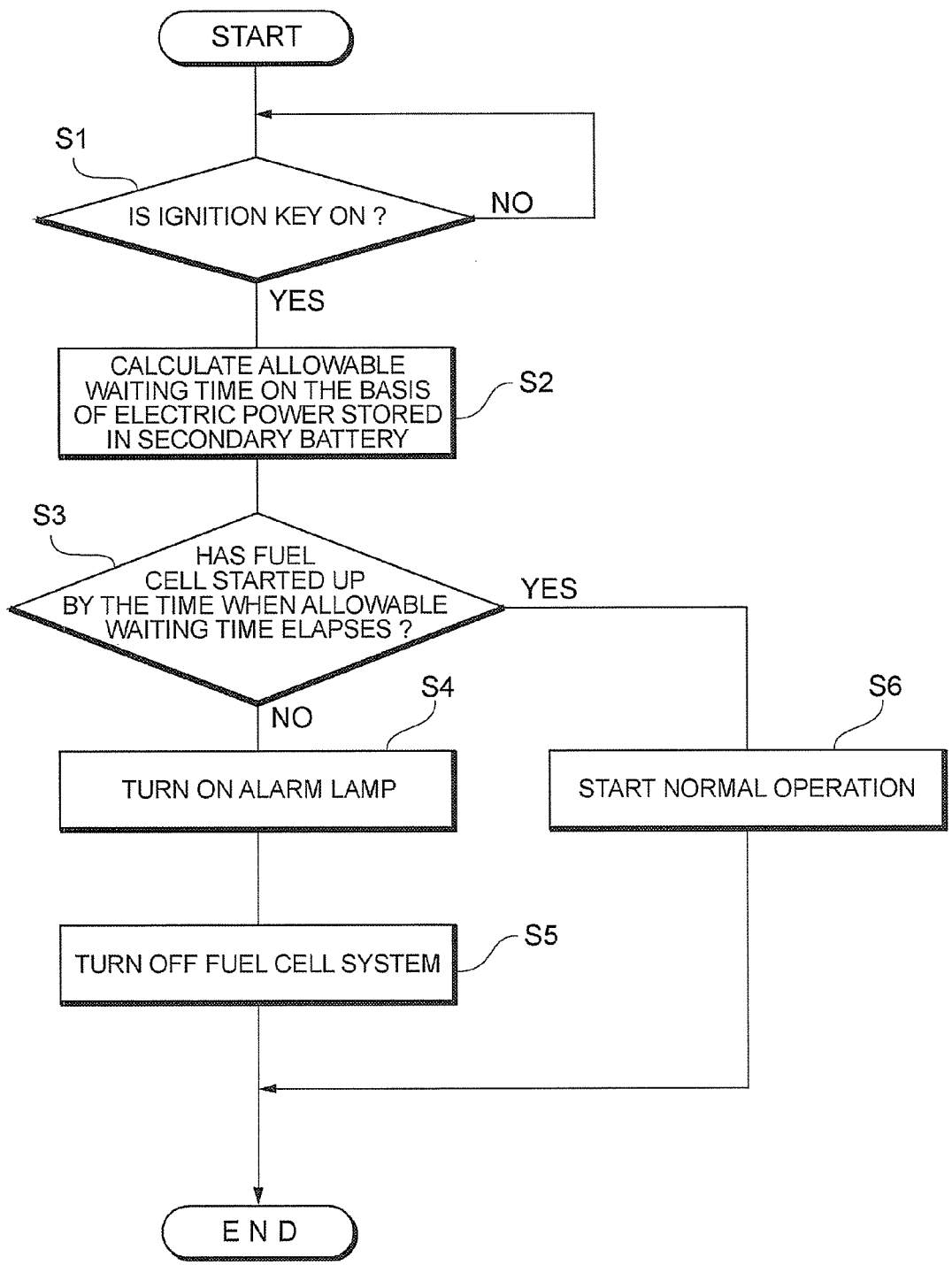
[FIG. 2] It is a flowchart for explaining the processing for starting up the fuel cell system according to the embodiment.

Referring to the flowchart given in FIG. 2, the processing for starting up the fuel cell system in the embodiment will now be described.

First, the controller 6 determines whether the ignition key has been turned on (step S1). If the determination result is NO (NO in step S1), then the controller 6 repeats the processing in step S1.

Meanwhile, if it is determined in the aforesaid step S1 that the ignition key has been turned on (YES in step S1), the controller 6 calculates the allowable waiting time for the fuel cell 2 to start up on the basis of the electric power stored in the secondary battery 52 (step S2).

Subsequently, the controller 6 determines whether the fuel cell 2 has started up during the period of time from the instant of turning on the ignition key to the elapse of the allowable waiting time (step S3). If the determination result is NO (NO in step S3), then the controller 6 turns on the alarm lamp indicating that the fuel cell 2 cannot be started up (step S4).

Subsequently, if the driver does not perform an operation to stop the fuel cell hybrid vehicle, then the controller 6 turns off the fuel cell system 1, saving the electric power necessary to start the operation of at least the traction motor 54 from the electric power stored in the secondary battery 52 (step S5). Thus, the fuel cell hybrid vehicle can be stopped, leaving the electric power that enables the traction motor 54 to operate at the time of a next startup.

Meanwhile, if it is determined in the aforesaid step S3 that the fuel cell 2 has started up (YES in step 3), then the controller 6 starts normal operation for actuating the traction motor 54 and the like by using the electric power generated by the fuel cell 2 and the electric power stored in the secondary battery 52 (step S6).

As described above, according to the fuel cell system 1 in the embodiment, the allowable waiting time for the fuel cell 2 to start up can be calculated on the basis of the electric power stored in the secondary battery 52 when starting up the fuel cell 2, and if the fuel cell 2 fails to start up by the time the allowable waiting time elapses from the startup operation is begun, then an alarm indicating the failure of the fuel cell 2 to start up can be issued. Thus, the fuel cell system 1 can be turned off without using up the electric power of the secondary battery 52 in the case of the startup failure of the fuel cell 2, while shortening the startup time of the fuel cell system 1 at the same time.

In the embodiment described above, the allowable waiting time is calculated when the request for starting up the fuel cell 2 is received; however, the timing of the calculation is not limited thereto. Alternatively, the allowable waiting time may be calculated as necessary after the request for starting up the fuel cell 2 is received. Further alternatively, the allowable waiting time may be repeatedly calculated according to a change in the opening degree of the accelerator pedal or the like, because the electric power required for actuating the traction motor 54 changes according to, for example, the opening degree of the accelerator pedal or the like.

Further, the above embodiments have disclosed the cases wherein the fuel cell system in accordance with the present invention has been mounted in a fuel cell hybrid vehicle. However, the fuel cell system in accordance with the present invention can be applied also to a variety of mobile bodies (e.g., a robot, a ship, aircraft, and the like) in addition to a fuel cell hybrid vehicle. Furthermore, the fuel cell system in accordance with the present invention can be applied also to a fixed power generation system used as power generating equipment for a building (a house, a building, or the like).

Industrial Applicability

The fuel cell system in accordance with the present invention is suited for being turned off without using up the electric power of a secondary battery if a fuel cell fails to start up, while reducing the startup time thereof at the same time.

The invention claimed is:

1. A fuel cell system comprising:
a fuel cell which generates electric power by an electrochemical reaction of a fuel gas and an oxidizing gas;
a power storage unit capable of storing electric power generated in the fuel cell;
a calculating device programmed to calculate allowable waiting time for the fuel cell to start up within a range of time, in which a power consuming device can be operated by using electric power stored by the power storage unit when a request for starting up the fuel cell is received;
an alarming device programmed to issue an alarm that the fuel cell cannot be started up in a case where the fuel cell fails to start up during a period of time from the receipt of a startup request until the allowable waiting time elapses; and
a control device programmed to operate the power consuming device by using the electric power generated by the fuel cell and the electric power stored in the power storage unit,
wherein the control device is programmed to turn off the fuel cell system, leaving electric power necessary for starting the operation of at least the power consuming device from the electric power stored by the power storage unit in the case where the fuel cell does not start up during the period of time from the receipt of the startup request until the allowable waiting time elapses.

* * * * *